United States Patent [19]

Kobayashi et al.

[11] 4,293,197
[45] Oct. 6, 1981

[54] TELEPHOTO LENS WITH SMALL TELEPHOTO RATIO

[75] Inventors: Koichi Kobayashi, Tokyo; Sadao Okudaira, Ranzan, both of Japan

[73] Assignee: Asahi Kogaku Kogyo Kabushiki Kaisha, Tokyo, Japan

[21] Appl. No.: 125,051

[22] Filed: Feb. 27, 1980

[30] Foreign Application Priority Data

Mar. 12, 1979 [JP] Japan .................................. 54-28394

[51] Int. Cl.$^3$ ............................................. G02B 13/02
[52] U.S. Cl. .................................................... 350/454
[58] Field of Search ........................................ 350/454

[56] References Cited

U.S. PATENT DOCUMENTS 4,113,357 9/1978 Nakamura ........................... 350/454

Primary Examiner—Conrad J. Clark
Attorney, Agent, or Firm—Sughrue, Mion, Zinn, Macpeak & Seas

[57] ABSTRACT

A high performance telephoto lens having a small telephoto ratio including eight lenses disposed in seven lens groups in front, intermediate and rear groups. The front lens group is composed of, in order, a positive lens having two curved surfaces with the surface of greater absolute value of curvature disposed on the object side, a positive meniscus lens having its convex surface disposed toward the object, a negative biconcave lens having the surface of greater absolute value of curvature disposed toward the image side, a positive meniscus lens having a convex surface directed toward the object. The intermediate lens groups includes two cemented lenses one of which is a negative biconcave lens disposed on the object side and a positive lens disposed on the image side. The rear lens group is composed of a negative lens with the surface of greater absolute value of curvature disposed on the object side and a positive convex lens with the surface of greater absolute value of curvature disposed on the image side. The lenses satisfy: $-1.2 < (r_6 + r_5)/(r_6 - r_5) < -0.7$, $6.7 < |f/r_9| < 7.6$, and $-0.5 < f(-1/r_{14} + 1/r_{15}) < 3$, where $r_i$ is the radius of curvature of the i-th lens surface and f is the overall focal length.

4 Claims, 6 Drawing Figures

TELEPHOTO LENS WITH SMALL TELEPHOTO RATIO

BACKGROUND OF THE INVENTION

Typically, a telephoto lens is composed of two lens groups spaced at some interval, the front lens group having a strong positive lens power and the rear lens group having a strong negative lens power. The greater the distance between the lens groups and the greater the absolute values of the lens power of the two lens groups, the smaller the telephoto ratio will become. However, various aberrations such as transverse chromatic aberration, curvature of the image field and distortion are increased disadvantageously.

SUMMARY OF THE INVENTION

In view of these facts, an object of the present invention is to provide a telephoto lens which corrects for the above noted defects. In one embodiment of a telephoto lens according to the present invention, a telephoto lens is composed of eight lenses grouped into seven lens groups. It includes a first lens group which is a single positive lens having two curved surfaces with the surface thereof greater in absolute value of curvature being disposed on the object side, a second lens group which is a single positive meniscus lens having a convex surface thereof directed to the object, a third lens group which is a negative biconcave lens with the surface thereof greater in an absolute value of curvature being disposed on the image side, a fourth lens which is a single positive meniscus lens having a convex surface thereof directed to the object wherein the first, second, third and fourth lens groups form a positive front lens group of the telephoto lens. There is also included a fifth lens group including two-cemented lenses composed of a single negative biconcave lens disposed on the object side and a single positive lens disposed on the image side with two cemented lenses forming a negative intermediate lens group of the telephoto lens, a sixth lens group which is a single negative lens with the surface thereof greater in an absolute value of curvature being disposed on the object side, and a seventh lens group which is a positive convex lens with the surface thereof greater in an absolute value of curvature being disposed on the image side wherein the sixth and seventh lens groups form a rear lens group of the telephoto lens. The rear lens group has an extremely weak lens power. The front, intermediate and rear lens groups are spaced at sufficient intervals to form said telephoto lens.

In another preferred embodiment of a telephoto lens according to the present invention, the sixth and seventh lenses are cemented to each other to form a lens system composed of eight lenses grouped into six lens groups. In these embodiments of telephoto lenses, an extremely small telephoto ratio is generated by an optical system composed of the front and intermediate lens groups. Such a telephoto ratio is maintained at a constant value by the rear lens group having a small lens power whereby aberrations generated due to an oblique beam of ray or extra-axial ray may be compensated for. A stop diaphragm is disposed in the vicinity of the intermediate lens group. With such a construction, slanted light beams which deviate up or down from the optical axis adjacent to the outermost portion of the first lens pass through portions near the upper and lower end of the effective lens aperture of the intermediate lens groups, respectively, and then enter the rear lens group which is spaced at a sufficient interval.

DESCRIPTION OF THE PREFERRED EMBODIMENTS

Figure 1:
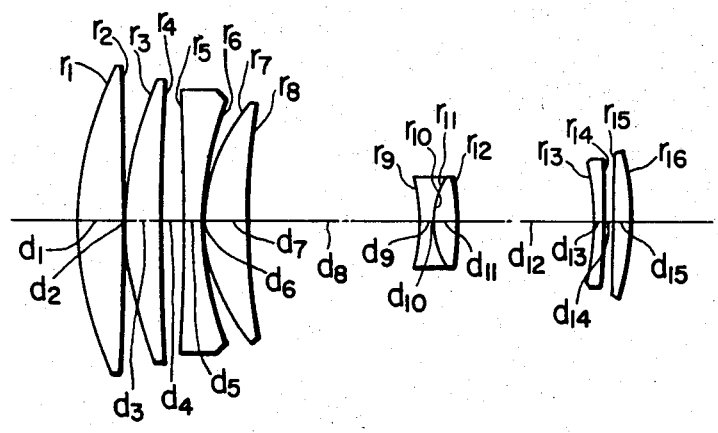
FIG. 1 is a cross-sectional view of a lens system representative of Examples 1, 2 and 3 embodying the invention.
Figure 2:
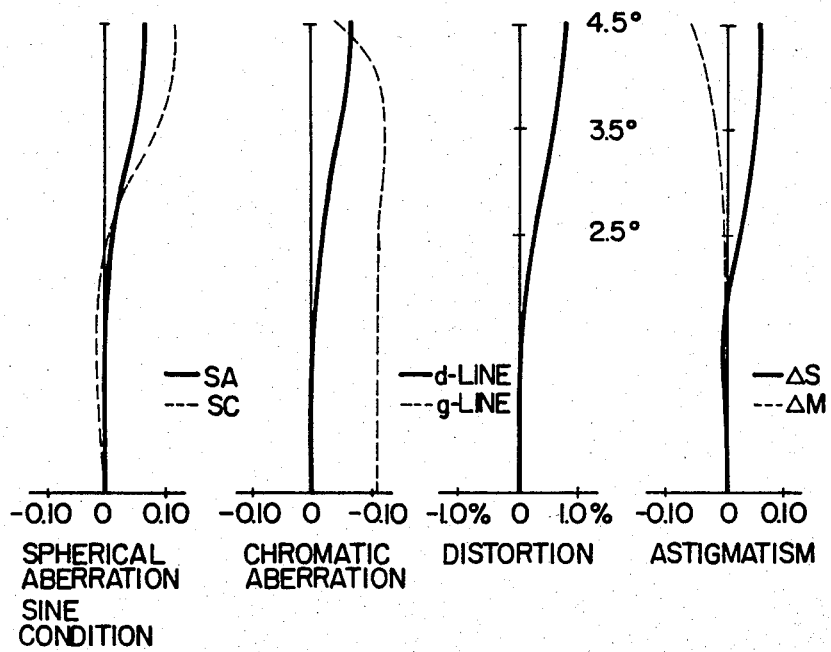
FIGS. 2, 3 and 4 are graphs of aberration curves according to Examples 1, 2 and 3.
Figure 3:
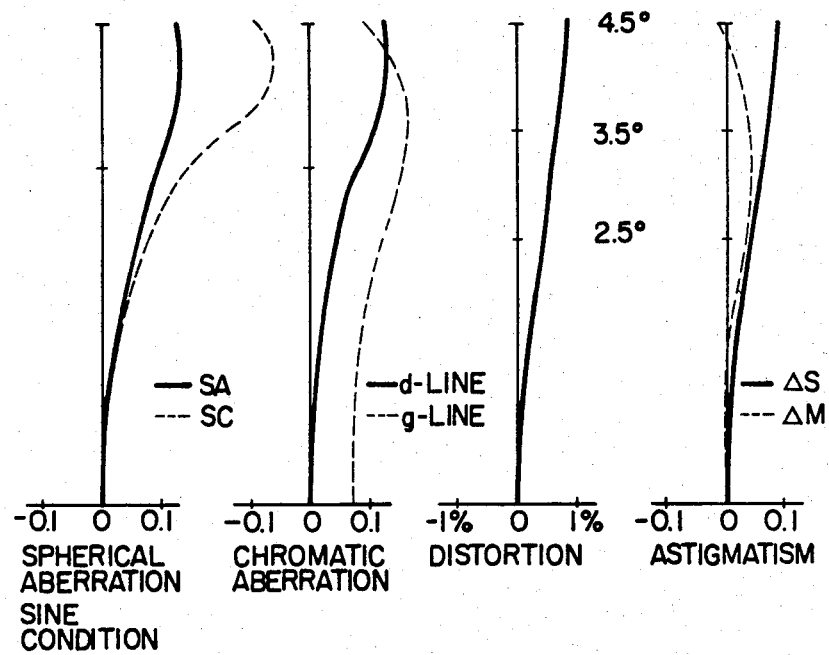
Figure 4:
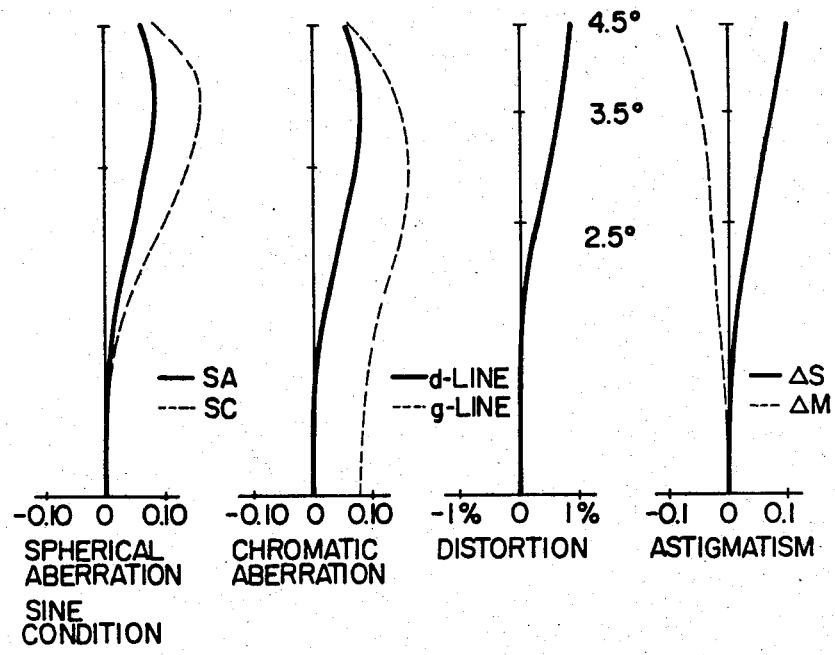
Figure 5:
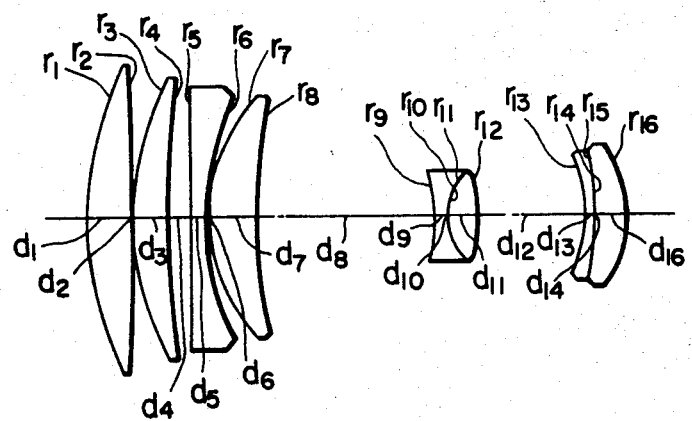
FIG. 5 is a cross-sectional view of a lens system constructed according to Example 4.
Figure 6:
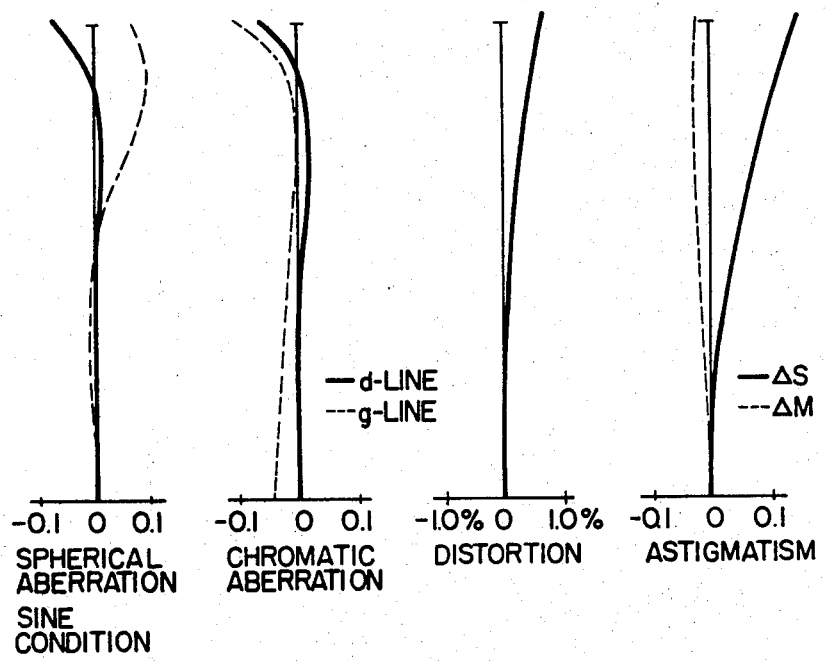
FIG. 6 is a graph showing aberration curves for Example 4.

With the novel lens construction specified above, the mean height of the oblique beam of ray extra-axial ray in the rear lens group is rather high in comparison with an axial ray height. This feature has not been seen in prior art telephoto lenses. Because of the relative mean height, aberrations in oblique beams of ray or extra-axial rays in the rear lens group may be compensated for. Further, for oblique rays deviating from the optical axis and entering the first lens group, light fluxes remote from the optical axis in the front lens group, that is, rays having a great height of light, and oblique rays nearer the optical axis than the above-described oblique rays, that is, rays having a small ray height, become beams near and remote from the optical axis in the rear lens group, respectively. The former and latter beams, respectively, are affected mainly in the front and rear lens groups. It is therefore possible to independently correct their aberrations. This is the reason why the overall lens system is separated into the front, intermediate and rear lens groups.

A lens system of the invention satisfies the following conditions which should be implemented to provide good aberration compensation along with the above-described requirements.

(1) $-1.2 < (r_6 + r_5)/(r_6 - r_5) < -0.7$,
(2) $6.7 < |f/r_9| < 7.6$, and
(3) $-0.5 < f(-1/r_{14} + 1/r_{15}) < 3$, where $r_i$ is the radius of curvature of the i-th lens surface and f is the overall focal length.

Condition (1) is required to compensate for spherical aberration, comatic aberration and astigmatism. When the upper limit is exceeded, spherical aberration is excessively compensated for, comatic aberration is deficiently compensated for and astigmatism is excessively compensated for. Inversely, when the lower limit is exceeded, spherical aberration is deficiently compensated for and the comatic aberration is excessively compensated for.

Condition (2) is required for offsetting a great amount of aberration generated in the front lens group with the intermediate lens group and to compensate for spherical aberration, comatic aberration and astigmatism. When the upper limit is exceeded, spherical aberration, comatic aberration and astigmatism are excessively compensated for whereas when the desired value is below the lower limit, all the above-described aberrations are deficiently compensated for.

If Conditions (1) and (2) are then satisfied, the most of the aberrations generated in the front lens group can be offset by the intermediate lens group. It is, however, necessary that the absolute value of the aberrations which still remain with the total lens length decreased be held small and the balanced state among the respective aberrations be again well maintained. The provision of a rear lens group as specified satisfies the above-described requirement. If the system is designed so that oblique beams of ray or extra-axial rays pass through the end portion of the rear lens group off the optical axis, the ability to compensate for rays deviating from the optical axis is greater than for beams on the axial axis. This tendency is particularly remarkable in regard to distortion compensation.

When the lower limit of Condition (3) is not satisfied, the effect of this distortion compensation is too weak and the overall distortion becomes highly positive. Such a defect is inherent in telephoto lenses, particularly super telephoto lenses. Inversely, when the upper limit is exceeded, the third order astigmatism coefficient is too small so that the compensation upon the image surface except for at the optical axis is impossible.

Specific examples according to the present invention will be described in which $r_i$ is the radius of curvature of the i-th lens surface, $d_i$ is the distance between the i-th lens surface and the next lens in sequence, and $v_i$ is the Abbe number of the i-th lens.

EXAMPLE 1

F/4  f = 100  viewing angle ± 4.5°  telephoto ratio 0.60

| | $r_i$ | $d_i$ | $N_i$ | $v_i$ |
|---|---|---|---|---|
| 1 | 28.45 | 3.79 | 1.49700 | 81.3 |
| 2 | −373.8 | 0.03 | | |
| 3 | 27.31 | 3.08 | 1.49700 | 81.3 |
| 4 | 162.76 | 1.88 | | |
| 5 | −335.17 | 1.64 | 1.80610 | 40.9 |
| 6 | 27.03 | 0.03 | | |
| 7 | 14.07 | 3.79 | 1.49700 | 81.3 |
| 8 | 46.93 | 14.96 | | |
| 9 | −13.97 | 1.11 | 1.79952 | 42.2 |
| 10 | 7.12 | 0 | | |
| 11 | 7.12 | 1.81 | 1.59270 | 35.3 |
| 12 | −29.56 | 11.71 | | |
| 13 | −15.42 | 0.76 | 1.88300 | 40.8 |
| 14 | −178.50 | 0.64 | | |
| 15 | 59.84 | 1.87 | 1.69895 | 30.1 |
| 16 | −16.86 | | | |

$$\frac{r_6 + r_5}{r_6 - r_5} = -0.85 \qquad |f/r_9| = 7.16$$

$$f(-1/r_{14} + 1/r_{15}) = 2.23$$

EXAMPLE 2

F/4  f = 100  viewing ± ±4.5°  telephoto ratio 0.60

| | $r_i$ | $d_i$ | $N_i$ | $v_i$ |
|---|---|---|---|---|
| 1 | 28.23 | 3.79 | 1.49700 | 81.3 |
| 2 | −463.77 | 0.03 | | |
| 3 | 24.28 | 2.77 | 1.49700 | 81.3 |
| 4 | 90.78 | 2.07 | | |
| 5 | 7884.48 | 1.68 | 1.80610 | 40.9 |
| 6 | 24.47 | 0.03 | | |
| 7 | 13.93 | 3.56 | 1.49700 | 81.3 |
| 8 | 48.20 | 15.05 | | |
| 9 | −13.28 | 1.05 | 1.79952 | 42.2 |
| 10 | 7.28 | 0 | | |
| 11 | 7.28 | 1.80 | 1.59270 | 35.3 |
| 12 | −25.68 | 11.48 | | |
| 13 | −17.38 | 0.69 | 1.88300 | 40.8 |
| 14 | 95.97 | 0.59 | | |
| 15 | 39.97 | 1.60 | 1.69895 | 30.1 |
| 16 | −16.77 | | | |

$$\frac{r_6 + r_5}{r_6 - r_5} = -1.01 \qquad |f/r_9| = 7.53$$

$$f(-1/r_{14} + 1/r_{15}) = 1.46$$

EXAMPLE 3

F/4  f = 100  viewing angle ± 4.5°  telephoto ratio 0.59

| | $r_i$ | $d_i$ | $N_i$ | $v_i$ |
|---|---|---|---|---|
| 1 | 28.87 | 3.79 | 1.49700 | 81.3 |
| 2 | −336.14 | 0.03 | | |
| 3 | 25.35 | 2.77 | 1.49700 | 81.3 |
| 4 | 123.26 | 2.07 | | |
| 5 | −595.13 | 1.68 | 1.80610 | 40.9 |
| 6 | 24.55 | 0.03 | | |
| 7 | 14.33 | 3.56 | 1.49700 | 81.3 |
| 8 | 54.26 | 15.05 | | |
| 9 | −14.66 | 1.05 | 1.77250 | 49.6 |
| 10 | 8.14 | 0 | | |
| 11 | 8.14 | 1.80 | 1.58144 | 40.7 |
| 12 | −27.32 | 11.48 | | |
| 13 | −13.33 | 0.69 | 1.81600 | 46.6 |
| 14 | −381.73 | 0.59 | | |
| 15 | 45.68 | 1.60 | 1.71736 | 29.5 |
| 16 | −21.49 | | | |

$$\frac{r_6 + r_5}{r_6 - r_5} = -0.92 \qquad |f/r_9| = 6.82$$

$$f(-1/r_{14} + 1/r_{15}) = 2.45$$

EXAMPLE 4

F/4  f = 100.25  viewing angle ± 4.5°  telephoto ratio 0.60

| | $r_i$ | $d_i$ | $N_i$ | $v_i$ |
|---|---|---|---|---|
| 1 | 27.638 | 3.94 | 1.49700 | 81.3 |
| 2 | −489.625 | 0.03 | | |
| 3 | 23.812 | 3.18 | 1.49700 | 81.3 |
| 4 | 98.143 | 1.69 | | |
| 5 | −1647.706 | 1.44 | 1.80610 | 40.9 |
| 6 | 24.546 | 0.03 | | |
| 7 | 14.079 | 4.10 | 1.49700 | 81.3 |
| 8 | 43.692 | 15.25 | | |
| 9 | −14.680 | 1.20 | 1.79952 | 42.2 |
| 10 | 5.635 | 0 | | |
| 11 | 5.635 | 2.30 | 1.59270 | 35.3 |
| 12 | −25.015 | 9.74 | | |
| 13 | −9.497 | 0.69 | 1.88300 | 40.8 |
| 14 | −20.143 | 0 | | |
| 15 | −20.143 | 2.80 | 1.69895 | 30.1 |
| 16 | −9.089 | | | |

$$\frac{r_6 + r_5}{r_6 - r_5} = -0.97 \qquad |f/r_9| = 6.83$$

$$f(-1/r_{14} + 1/r_{15}) = 0$$

What is claimed is:

1. A high performance telephoto lens having a small telephoto ratio and being composed of eight lenses grouped into seven lens groups wherein said lenses satisfy the following conditions:

F/4  f = 100  viewing angle ±4.5°  telephoto ratio 0.60

| | $r_i$ | $d_i$ | $N_i$ | $v_i$ |
|---|---|---|---|---|
| 1 | 28.45 | 3.79 | 1.49700 | 81.3 |
| 2 | −373.8 | 0.03 | | |
| 3 | 27.31 | 3.08 | 1.49700 | 81.3 |
| 4 | 162.76 | 1.88 | | |
| 5 | −335.17 | 1.64 | 1.80610 | 40.9 |
| 6 | 27.03 | 0.03 | | |
| 7 | 14.07 | 3.79 | 1.49700 | 81.3 |
| 8 | 46.93 | 14.96 | | |
| 9 | −13.97 | 1.11 | 1.79952 | 42.2 |
| 10 | 7.12 | 0 | | |
| 11 | 7.12 | 1.81 | 1.59270 | 35.3 |
| 12 | −29.56 | 11.71 | | |
| 13 | −15.42 | 0.76 | 1.88300 | 40.8 |
| 14 | −178.50 | 0.64 | | |
| 15 | 59.84 | 1.87 | 1.69895 | 30.1 |
| 16 | −16.86 | | | | where $r_i$ is the radius of curvature of the i-th lens surface, $d_i$ is the distance between the i-th lens surface and the next lens in sequence, and $\nu_i$ is the Abbe number of the i-th lens.

2. A high performance telephoto lens having a small telephoto ratio and being composed of eight lens groups into seven lens groups wherein said lenses satisfy the following conditions:

| F/4 | f = 100 | viewing angle ±4.5° | telephoto ratio 0.60 | |
|---|---|---|---|---|
| | $r_i$ | $d_i$ | $N_i$ | $\nu_i$ |
| 1 | 28.23 | 3.79 | 1.49700 | 81.3 |
| 2 | −463.77 | 0.03 | | |
| 3 | 24.28 | 2.77 | 1.49700 | 81.3 |
| 4 | 90.78 | 2.07 | | |
| 5 | 7884.48 | 1.68 | 1.80610 | 40.9 |
| 6 | 24.47 | 0.03 | | |
| 7 | 13.93 | 3.56 | 1.49700 | 81.3 |
| 8 | 48.20 | 15.05 | | |
| 9 | −13.28 | 1.05 | 1.79952 | 42.2 |
| 10 | 7.28 | 0 | | |
| 11 | 7.28 | 1.80 | 1.59270 | 35.3 |
| 12 | −25.68 | 11.48 | | |
| 13 | −17.38 | 0.69 | 1.88300 | 40.8 |
| 14 | 95.97 | 0.59 | | |
| 15 | 39.97 | 1.60 | 1.69895 | 30.1 |
| 16 | −16.77 | | | | where $r_i$ is the radius of curvature of the i-th lens surface, $d_i$ is the distance between the i-th lens surface and the next lens in sequence, and $\nu_i$ is the Abbe number of the i-th lens.

3. A high performance telephoto lens having a small telephoto ratio and being composed of eight lenses grouped into seven lens groups wherein said lenses satisfy the following conditions:

| F/4 | f = 100 | viewing angle ±4.5° | telephoto ratio 0.59 | |
|---|---|---|---|---|
| | $r_i$ | $d_i$ | $N_i$ | $\nu_i$ |
| 1 | 28.87 | 3.79 | 1.49700 | 81.3 |
| 2 | −336.14 | 0.03 | | |
| 3 | 25.35 | 2.77 | 1.49700 | 81.3 |
| 4 | 123.26 | 2.07 | | |
| 5 | −595.13 | 1.68 | 1.80610 | 40.9 |
| 6 | 24.55 | 0.03 | | |
| 7 | 14.33 | 3.56 | 1.49700 | 81.3 |
| 8 | 54.26 | 15.05 | | |
| 9 | −14.66 | 1.05 | 1.77250 | 49.6 |
| 10 | 8.14 | 0 | | |
| 11 | 8.14 | 1.80 | 1.58144 | 40.7 |
| 12 | −27.32 | 11.48 | | |
| 13 | −13.33 | 0.69 | 1.81600 | 46.6 |
| 14 | −381.73 | 0.59 | | |
| 15 | 45.68 | 1.60 | 1.71736 | 29.5 |
| 16 | −21.49 | | | | where $r_i$ is the radius of curvature of the i-th lens surface, $d_i$ is the distance between the i-th lens surface and the next lens in sequence, and $\nu_i$ is the Abbe number of the i-th lens.

4. A high performance telephoto lens having a small telephoto ratio and being composed of eight lenses grouped into seven lens groups wherein said lenses satisfy the following conditions:

| F/4 | f = 100.25 | viewing angle ±4.5° | telephoto ratio 0.60 | |
|---|---|---|---|---|
| | $r_i$ | $d_i$ | $N_i$ | $\nu_i$ |
| 1 | 27.638 | 3.94 | 1.49700 | 81.3 |
| 2 | −489.625 | 0.03 | | |
| 3 | 23.812 | 3.18 | 1.49700 | 81.3 |
| 4 | 98.143 | 1.69 | | |
| 5 | −1647.706 | 1.44 | 1.80610 | 40.9 |
| 6 | 24.546 | 0.03 | | |
| 7 | 14.079 | 4.10 | 1.49700 | 81.3 |
| 8 | 43.692 | 15.25 | | |
| 9 | −14.680 | 1.20 | 1.79952 | 42.2 |
| 10 | 5.635 | 0 | | |
| 11 | 5.635 | 2.30 | 1.59270 | 35.3 |
| 12 | −25.015 | 9.74 | | |
| 13 | −9.497 | 0.69 | 1.88300 | 40.8 |
| 14 | −20.143 | 0 | | |
| 15 | −20.143 | 2.80 | 1.69895 | 30.1 |
| 16 | −9.089 | | | | where $r_i$ is the radius of curvature of the i-th lens surface, $d_i$ is the distance between the i-th lens surface and the next lens in sequence, and $\nu_i$ is the Abbe number of the i-th lens.

* * * * *